United States Patent [19]

Buck

[11] Patent Number: 4,885,633

[45] Date of Patent: Dec. 5, 1989

[54] QUANTITATIVE SURFACE TEMPERATURE MEASUREMENT USING TWO-COLOR THERMOGRAPHIC PHOSPHORS AND VIDEO EQUIPMENT

[75] Inventor: Gregory M. Buck, Newport News, Va.

[73] Assignee: The United States of America as represented by the Administrator of the National Aeronautics and Space Administration, Washington, D.C.

[21] Appl. No.: 205,900

[22] Filed: Jun. 13, 1988

[51] Int. Cl.$^4$ .............................................. H04N 7/18
[52] U.S. Cl. ................................ 358/93; 250/459.1; 250/461.1; 358/113; 374/162
[58] Field of Search ................. 358/93, 107, 110, 113; 374/162, 161; 250/458.1, 459.1, 461.1

[56] References Cited

U.S. PATENT DOCUMENTS

| | | | |
|---|---|---|---|
| 2,923,827 | 2/1960 | Dessauer et al. | 250/208 |
| 3,451,254 | 6/1969 | Maley | 73/355 |
| 3,583,223 | 6/1971 | Olsson | 73/355 |
| 4,203,326 | 5/1980 | Gottlieb | 374/162 |
| 4,278,349 | 7/1981 | Sander | 356/44 |
| 4,307,376 | 12/1981 | Miller et al. | 382/6 |
| 4,531,834 | 7/1985 | Nogami | 250/461.1 |
| 4,560,286 | 12/1985 | Wickersheim | 250/461.1 |
| 4,590,512 | 5/1986 | Kondo | 358/29 |
| 4,613,237 | 9/1986 | Melton | 374/162 |
| 4,619,533 | 10/1986 | Lucas et al. | 374/141 |
| 4,717,952 | 1/1988 | Kohayakawa | 358/113 |
| 4,729,668 | 3/1988 | Angel | 374/161 |
| 4,745,285 | 5/1988 | Recktenwald | 250/461.1 |
| 4,759,033 | 7/1988 | Ariessohn | 374/161 |

OTHER PUBLICATIONS

K. A. Wickersheim and R. A. Buchanan, "Position of the Energy Levels of Trivalent Rare-Earth Activator Ions Relative to the Electronic Energy Bands of Lanthanum Oxysulfide: A New Picture of Excitation and Relaxation", vol. 17, No. 5, Applied Physics Letters, Sep. 1, 1970, pp. 184-187.

*Primary Examiner*—Howard W. Britton
*Attorney, Agent, or Firm*—Harold W. Adams; John R. Manning; Charles E. B. Glenn

[57] ABSTRACT

A thermal imaging system provides quantitative temperature information and is particularly useful in hypersonic wind tunnel applications. An object to be measured is prepared by coating with a two-color, ultraviolet-activated, thermographic phosphor. The colors emitted by the phosphor are detected by a conventional color video camera. A phosphor emitting blue and green light with a ratio that varies depending on temperature is used so that the intensity of light in the blue and green wavelengths detected by the blue and green tubes in the video camera can be compared. Signals representing the intensity of blue and green light at points on the surface of a model in a hypersonic wind tunnel are used to calculate a ratio of blue to green light intensity which provides quantitative temperature information for the surface of the model.

3 Claims, 2 Drawing Sheets

FIG. 1
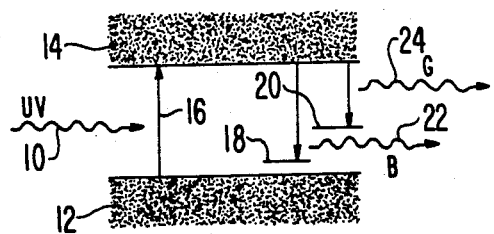
FIG. 2A  FIG. 2B
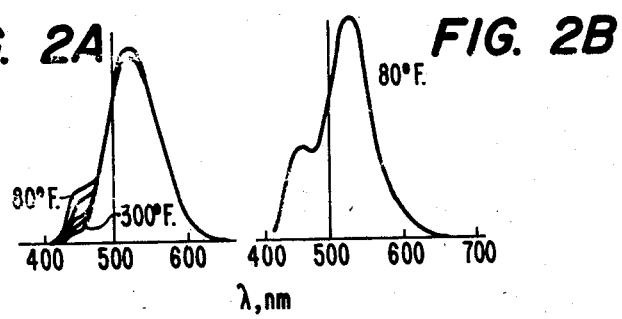
FIG. 3  FIG. 5
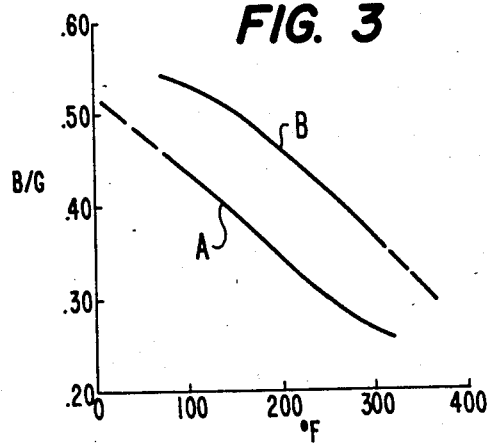 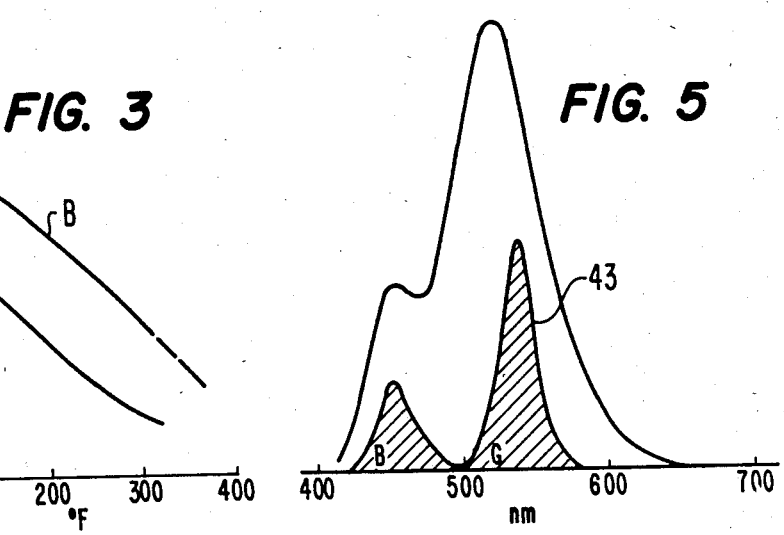

QUANTITATIVE SURFACE TEMPERATURE MEASUREMENT USING TWO-COLOR THERMOGRAPHIC PHOSPHORS AND VIDEO EQUIPMENT

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

1. Field of the Invention

The present invention is related to surface temperature measurement where visual access is readily available and, more particularly, to a method and apparatus for quantitative surface temperature measurement of a model in a hypersonic wind tunnel.

2. Description of the Related Art

Evaluation of designs for vehicles traveling at high speeds, particularly vehicles launched into space from earth or returning to earth from space, requires aerothermodynamic data regarding the effects of high speed air flow around the vehicle. This data is typically obtained by testing models in hypersonic wind tunnels capable of generating air speeds up to Mach 10. The measurement of primary interest is heat transfer rate to the model surface. Conventionally, these measurements are obtained by either discrete measurement of the surface temperature - time history, using thermocouples or thin-film resistance gauges, or thermal mapping via optical techniques such as photographing phase change paint, color sensitive paint, liquid crystal patterns, infrared sensitive measuring devices or thermographic phosphors. Each technique has its own advantages and disadvantages. The discrete measurement techniques provide detailed quantitative information, but models for wind tunnel tests are expensive to produce and the temperature information obtained is only at selected spots, not the entire surface of the model. The thermal mapping techniques can be used with less expensive models, but the temperature information obtained is essentially qualitative, making comparison between different models difficult.

SUMMARY OF THE INVENTION

An object of the present invention is to provide a method for low cost quantitative temperature mapping of an object.

Another object of the present invention is to provide a thermal imaging system using conventional components which is capable of quantitative temperature mapping.

Yet another object of the present invention is to provide a quantitative imaging system for a model in a hypersonic wind tunnel.

The above objects are attained by providing a thermal imaging system comprising: an object having a surface including a substance activatable to emit multi-colored light with each color quenched at a different temperature, activation means for activating the substance at the surface of the object during a temperature measurement period and detection means for detecting the temperature of the substance at the surface of the object in dependence upon intensity of each color of the multi-colored light emitted during the temperature measurement. The system is preferably used in a method of measuring surface temperature of an object, comprising the steps of applying a coating to the object, the coating emitting multiple colors with temperature sensitivity when activated, activating the coating during a temperature measurement period to produce light emissions of at least two wavelengths, detecting intensity of the light emissions at two of the wavelengths and producing a temperature indication in dependence upon a ratio of the intensity of the detected light emissions.

Preferably, the substance coating the object is an ultraviolet activated phosphor such as a two-color thermographic phosphor emitting light at wavelengths corresponding to blue and green light when activated by directing ultraviolet onto the object. The detection means preferably comprises a video camera positioned to receive the light emissions from the object, the video camera having tubes producing signals indicating the intensity of light received in blue and green color bands with centers between 430 to 470 nanometers and 510 to 560 nanometers, respectively. The temperature indication is preferably produced by calculating a ratio between blue and green light emissions from the object using the signals produced by the blue and green light tubes of the video camera.

The system is preferably calibrated by heating a sample coated with the ultraviolet activated substance to known temperatures while directing ultraviolet light onto the sample, detecting the light emitted from the sample using the video camera to produce signals representing the intensity of blue and green light and calculating and recording standard ratios between the blue and green light at the known temperatures. After calibration, the ratio of blue-to-green light calculated during the temperature measurement period can be compared with the standard ratios to produce a signal representing a temperature of the object at any point on the surface of the object.

BRIEF DESCRIPTION OF THE DRAWINGS

FIG. 1 is an energy level diagram for a blue-green phosphor;

FIGS. 2A and 2B are spectral energy distributions for two two-color phosphors;

FIG. 3 is a graph of blue/green intensity ratio versus temperature for the two phosphors in FIGS. 2A and 2B;

FIG. 5 is a graph of spectral energy distribution for one of the phosphors and the distribution of filtered light for the phosphor in the system illustrated in FIG. 4.

DESCRIPTION OF THE PREFERRED EMBODIMENTS

Figure 4:
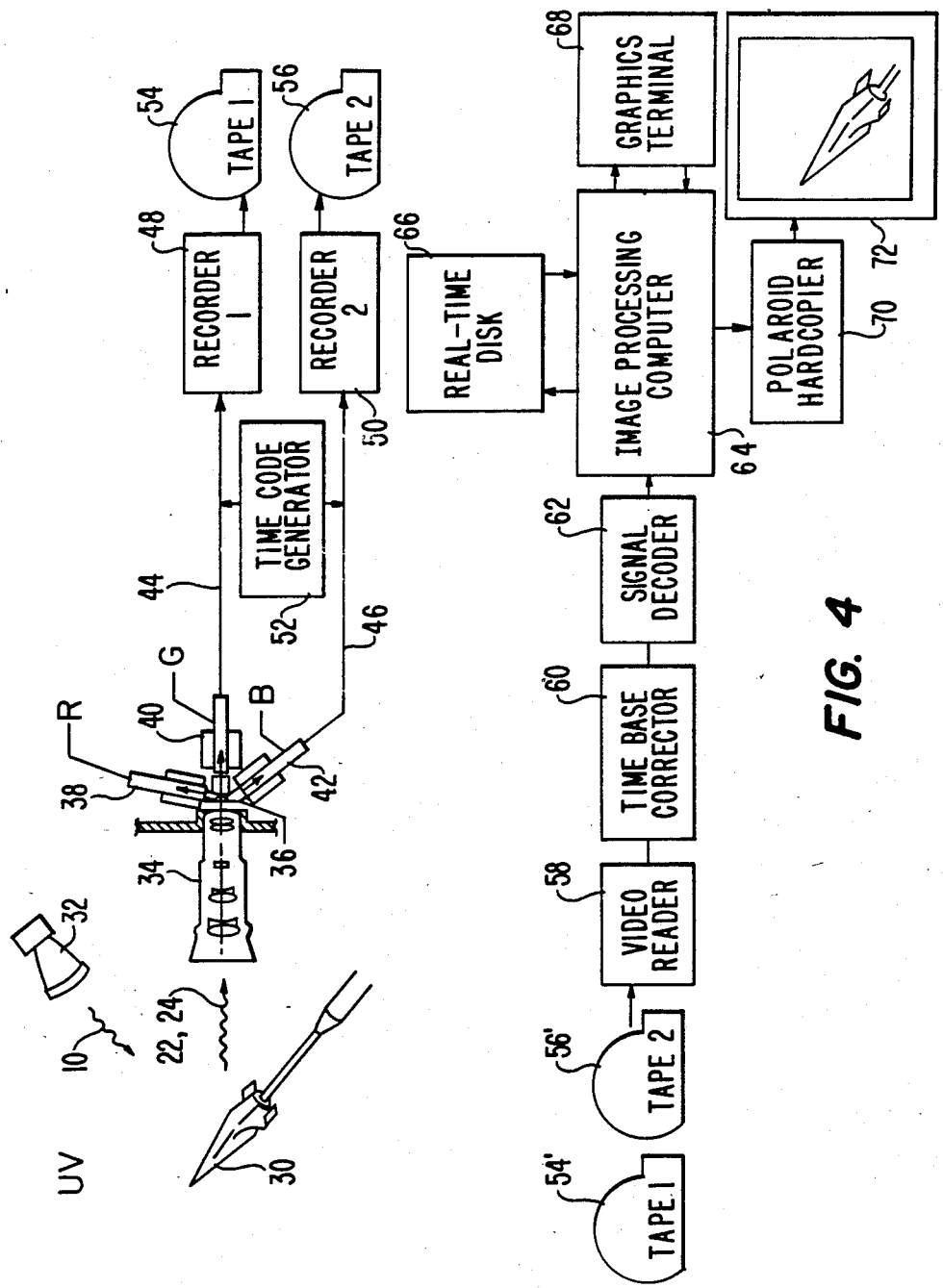
FIG. 4 is a block diagram of a thermal imaging system according to the present invention.

The present invention is able to measure surface temperature of an object optically due to the use of a substance, having particular properties at the surface of the object. The substance is activatible to emit multi-colored light, typically two-color light, with each color quenched at a different temperature. In the preferred embodiment, an ultraviolet activated phosphor is used to coat the object. A group of RADELIN phosphors are produced by USR Optonix Inc. of Hackettstown, New Jersey. These phosphors are excited by absorbing ultraviolet (UV) light 10 at a safe wavelength of, e.g., 365 nanometers. The excitation causes electrons to be raised from the valence band 12 to the conduction band 14 as indicated by arrow 16. Trace impurities in the lattice structure of the phosphor material establish intermediate energy levels 18, 20. During the relaxation process, electrons fall to one of the intermediate levels 18, 20 and in the process give off a blue or green photon 22, 24 depending upon which energy level is reached.

As illustrated in FIG. 2A, these phosphors are temperature sensitive due to the difference between energy levels 18 and 20. As the phosphor is heated, the energy level of the valence band 12 is raised, "quenching" the energy level 18 which generates a blue photon 22. This occurs prior to the quenching of energy level 20 (if this ever occurs) which is reached with the production of a green photon 24. The brightness of the phosphors depends upon the intensity of the ultraviolet light which activates the phosphor to induce surface fluorescence. Due to the "quenching" effect, the ratio of blue-to-green light is a function of temperature. However, the ratio of blue-to-green light is independent of the intensity of the ultraviolet illumination.

Experimental data for the two phosphors, whose spectral distribution is illustrated in FIGS. 2A and 2B, are provided in FIG. 3. The lower curve A corresponds to the phosphor illustrated in FIG. 2A which is zinc sulfide with trace amounts of copper and nickel and is available under the trade name RADELIN 2090. The phosphor tested to produce curve B in FIG. 3 corresponds to the spectral distribution illustrated in FIG. 2B which is zinc sulfide with trace amounts of copper and is available under the trade name RADELIN 3003. As illustrated in FIG. 3, curve A is substantially linear between the experimentally tested temperatures of 75 and 250° F. (24° to 120° C.) and is expected to remain linear down to approximately 0° F. (−18° C.), while the phosphor corresponding to curve B is expected to be linear between 150° F. to 400° F. (65° C. to 204° C.). If the nonlinear portions of the curve are taken into account by the calculation methods, the useful range of each phosphor can be extended.

Conventionally, quantitative information is available from using RADELIN and other phosphors only by instrumenting the model to detect the intensity of ultraviolet energy received. This results in increased cost and relatively low precision due to variation of intensity on different parts of the model depending upon the size and shape of the model and the location of the radiation measuring device(s). These problems are avoided by using the intensity ratio of blue-to-green light in the present invention. This ratio can be easily produced using a conventional color video camera as described below.

When using the present invention to measure temperature in a wind tunnel, a two-color phosphor coating can be applied to conventional models which are typically constructed of materials possessing relatively low values of thermal product (pck), where p = mass density, c = heat capacity and k = thermal conductivity. Conventional materials are polymer plastics or ceramics. Polymer plastics are preferable, provided the maximum temperature to which they will be exposed is between 400° and 600° F. (200° to 320° C.), due to the toughness, resiliency and moldability of this material. To withstand higher temperatures, ceramic models are constructed of MACOR glass or, preferably, alumina ceramics which require less machining. Plastic models formed from STYCAST epoxy plastic can be coated with phosphor material, available in a 9 micron particle size powder, by mixing with a clear catalyzed polyurethane coating. Ceramic models made of MACOR machinable glass or castable alumina can be coated with phosphor material using a fused silica colloidal mixture to bind the phosphor material to the ceramic surfaces and curing at room temperature for two to three days. Both types of mixtures can be applied to the models using a conventional spray brush.

As illustrated in FIG. 4, according to the present invention a model 30 absorbs ultraviolet light 10 from a lamp 32 which can be mounted outside a wind tunnel (not shown). The light emissions 22, 24 from the phosphor coating of the object are focused by a lens system 34 and separated by a prism dispersion filter 36 directing light in the red wavelengths to tube 38, light in the green wavelengths to tube 40 and light in the blue wavelengths to tube 42. The prism 36 in the video camera separates the light emissions into two light paths to produce a spectral distribution 43 of separate blue and green bands of wavelengths as illustrated in FIG. 5. This results in the blue tube 42 detecting light emissions in a band centered at typically 450 nanometers, while the green tube 40 detects light in a band centered typically at 520 nanometers. When using phosphors having spectral distributions like those illustrated in FIGS. 2A and 2B, the center of the blue band may range between 440 and 460 nanometers while the center of the green band may range between 520 and 550 nanometers. Other phosphors or other substances activated in another manner may be used with an appropriate filtering and detection system, but the use of ultraviolet activated phosphors with a spectral distribution similar to those in FIGS. 2A and 2B are preferable so that the filtering and detection means can be a conventional video camera.

Signals 44 and 46 produced by the green and blue tubes 40, 42 are recorded by recorders 48, 50 together with time codes from a time code generator 52 on tapes 54, 56. These tapes can be saved for processing later as indicated by tapes 54', 56' in FIG. 4 or can be saved as a record of the received data for subsequent comparisons while the signals 44 and 46 are subjected to real-time processing. Other methods of recording the signals 44, 46 and calculating the ratio derived therefrom, may of course be used.

In the batch processing system illustrated in FIG. 4, the tapes 54', 56' are input via video reader(s) 58, subjected to time base correction in time base corrector 60 and decoded by decoder 62. The signal decoder 62 includes analog/digital conversion if the recorders 48 and 50 are conventional analog video tape devices. The resulting signals can be processed in a conventional image processing computer 64, such as a Gould IP8000 run from a host PDP 11/34 computer and stored in a memory such as a real-time disk 66. The image processing computer 64 is programmed to calculate a ratio between blue and green light emissions from the object using the signals stored in the real-time disk and to output a temperature signal in dependence upon the calculated ratio. This ratio can be displayed graphically on a graphics terminal 68 or a POLAROID hard copier 70 to produce a thermal image 72.

Alternatively, on-site thermal image processing can be provided using a personal computer with the necessary peripheral units connecting the tubes 40, 42 of the video camera and the processor of the personal computer. It is also possible to process the data in analog form using a wide band dual channel linear multiplier/- divider such as the AD539 manufactured by Analog Devices of Norwood, Mass., with appropriate signal adjustments so that the ratio of blue-to-green light emissions can be recorded and displayed.

Regardless of which type of system is used, the system is calibrated by applying the blue-green thermographic phosphor coating to a sample which may be the object to be tested, heating the sample to known temperatures, e.g., in an oven, while activating the blue-green thermographic phosphor by directing ultraviolet light onto the sample and producing signals indicating the intensity of light received in green and blue color bands using the thermal imaging system that will be used to measure the temperature of the object. The signals produced during calibration of the system are used to calculate standard ratios between blue and green light emissions which are recorded together with the temperature corresponding thereto. During subsequent (or preceding) temperature measurement, e.g., in a wind tunnel, the intensity ratio of blue-to-green light at any point can be compared with the standard ratios to determine the temperature of the surface of the model at that point and time.

The many features and advantages of the present invention are apparent from the detailed specification, and thus it is intended by the appended claims to cover all such features and advantages of system which fall within the true spirit and scope of the invention. Further, since numerous modifications and changes will readily occur to those skilled in the art, it is not desired to limit the invention to the exact construction and operation illustrated and described. Accordingly, all suitable modifications and equivalents may be resorted to falling within the scope and spirit of the invention.

What is claimed is:

1. A method of measuring surface temperature of an object comprising the step of:
   (a) applying a blue-green thermographic phosphor coating to the object, the blue-green phosphor coating emitting both blue and green light when activated by receiving electromagnetic radiation with a wavelength between 100 to 400 nanometers,
   (b) activating the coating with ultraviolet light during a temperature measurement period to produce blue and green light emission of at least two wavelengths,
   (c) detecting the intensity of said blue and green light emissions and producing signals indicating the intensity of the light received in said blue and green colors with centers between 430 to 470 nanometers and 510 and 560 nanometers respectively.
   (d) producing a temperature indication in dependence upon a ratio of the intensity of said blue and green light emissions by calculating a ratio between said blue and green light signals and outputting a temperature signal in dependence upon said calculated ratio; and
   (e) calibrating the calculated ratio including the step of:
      (i) applying the blue-green thermographic phosphor coating to a sample;
      (ii) heating the sample to known temperature while activating the blue-green thermographic phosphor coating;
      (iii) producing the signals indicating the intensity of light receive in the blue and green color bands; and
      (iv) calculating and recording standard ratios between blue and green light emissions at the known temperatures, and
   thereafter comparing said calculated and standard ratios.

2. A method as recited in claim 1, wherein the sample is the object and step ii comprises heating the object in an oven to the known temperature.

3. A method as recited in claim 2, wherein the ultraviolet light has a wavelength of approximately 356 nanometers and the center of the blue and green color bands are approximately 450 and 520 nanometers, respectively.

* * * * *